United States Patent [19]

Hatter

[11] 4,216,585

[45] Aug. 12, 1980

[54] DEPTH GAGE

[75] Inventor: Edwin E. Hatter, Torrance, Calif.

[73] Assignee: Hi-Shear Corporation, Torrance, Calif.

[21] Appl. No.: 945,907

[22] Filed: Sep. 26, 1978

[51] Int. Cl.² ............................................. G01B 5/18
[52] U.S. Cl. ............................................... 33/169 B
[58] Field of Search ....... 33/169 B, 126.7 R, 126.7 A, 33/178 R, 169 R, 143 R

[56] References Cited

U.S. PATENT DOCUMENTS

| | | | |
|---|---|---|---|
| 1,248,340 | 11/1917 | Kinney | 33/169 B |
| 3,962,793 | 6/1976 | Blume | 33/169 B |

FOREIGN PATENT DOCUMENTS 2535 of 1875 United Kingdom ................. 33/178 R

*Primary Examiner*—Willis Little
*Attorney, Agent, or Firm*—Donald D. Mon

[57] ABSTRACT

A depth gage for indicating the depth of a hole through a workpiece which is to be attached to a nut-plate by a threaded fastener, comprises a rod with a cylindrical portion adapted to pass through the hole and abut the nut-plate so that a forward section of the rod enters within the threads of the nut-plate. A sleeve slidable on the rod in front of the workpiece can be slid to abut the front surface of the workpiece. Graduated markings on the rod indicate the depth of the hole.

4 Claims, 9 Drawing Figures

U.S. Patent   Aug. 12, 1980   4,216,585
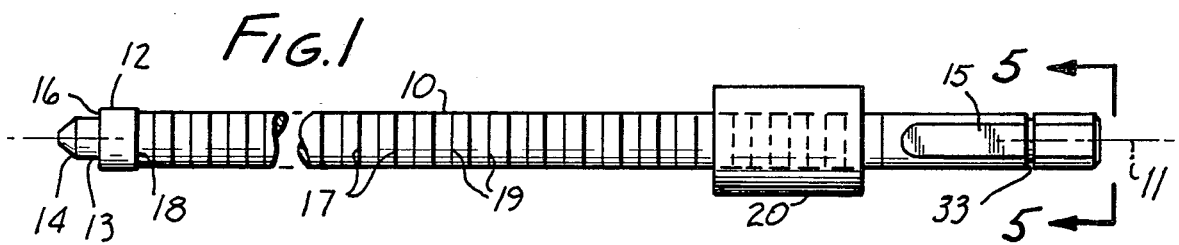
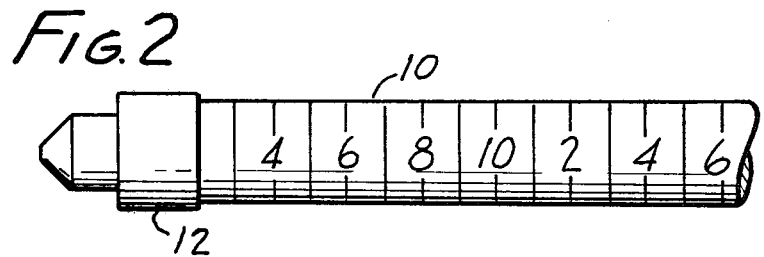
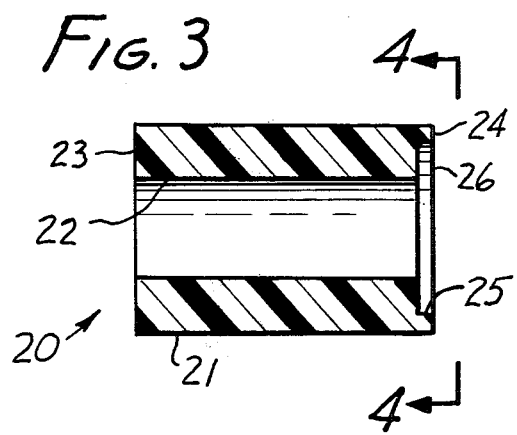
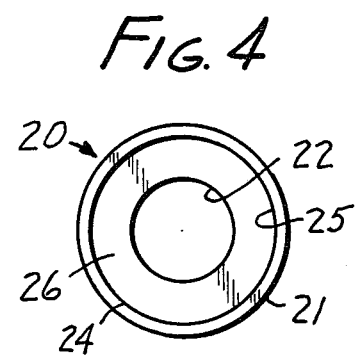
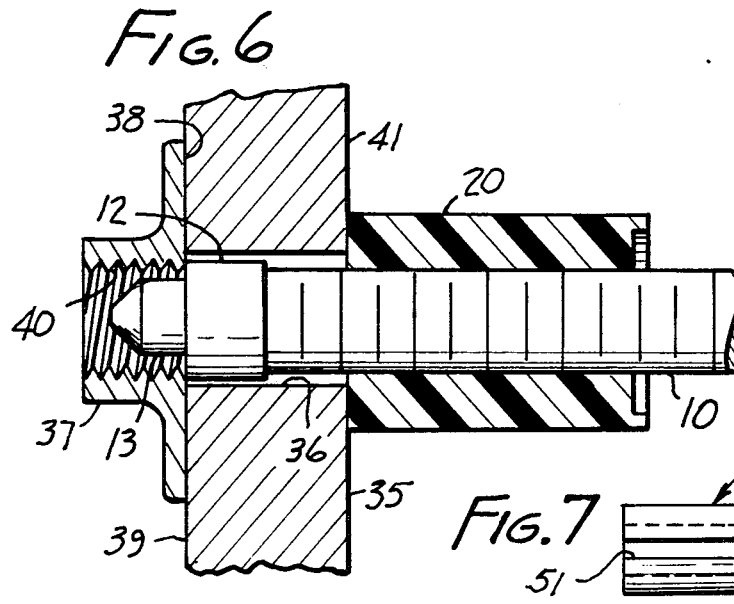
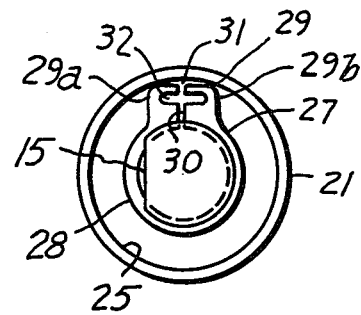
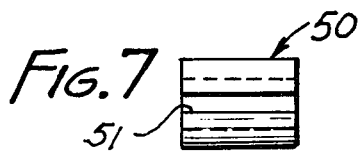

DEPTH GAGE

This invention relates to a grip gage for measuring the depth of a hole through a workpiece which is to be held by a threaded fastener to a nut-plate or blind-bolt.

It is a well-known practice to attach a member or workpiece to a nut-plate by a bolt passed through the member or workpiece into the nut-plate. Typically, a hole will be drilled through the workpiece of a proper diameter to accommodate a desired diameter bolt, and the diameter of the hole will indicate the diameter of the threaded hole through the nut-plate which is to be selected. Ordinarily, the diameter of the threaded hole through the nut-plate should be such that the diameter at the base of the threads is approximately equal to, or slightly less than, the diameter of the hole through the workpiece, and the inside diameter of the threads will be significantly less. Although the diameter of the bolt to be passed through the workpiece and into the nut-plate is established, it is not always known just how long the bolt should be in order to pass through the hole of the workpiece and thread completely into the nut-plate without undesired protrusion of the threaded end of the bolt beyond the nut-plate.

It is an object of the present invention to provide a simple and inexpensive depth gage which will very easily and quickly furnish information as to the exact depth of the hole through the workpiece.

The invention is carried out by provision of a rod to be inserted through the hole of the workpiece and into the nut-plate. The rod is provided with an abutting section close to its rearward end and small enough to pass through the hole of the workpiece but large enough so that it abuts and is blocked by the surface of the nut-plate which lies flush against the rear surface of the workpiece. The section of the rod rearward of the abutting section is small enough to pass within the threads of the nut, thereby allowing the rearward wall of the abutting section to abut the nut-plate either the face of the nut, or the counterbore of the nut if a floating nut is carried by a self-aligning nut plate. Both such events are referred to as "abutting the nut". The region of the gage in front of the abutting section is provided with graduated markings to indicate distance from the grip plane, that is, the plane where the abutting section abuts the nut-plate. A slidable sleeve is mounted on the rod in front of the abutting section, of a diameter greater than that of the hole through the workpiece. When the abutting section is abutted against the grip plane and the sleeve is slid into abutment with the front face of the workpiece, the reading of the indicia on the rod at the rearward edge of the sleeve will indicate the depth of the hole. Since the depth of the threaded hole through the nut-plate will be known, the information as to the depth of the hole through the workpiece quickly indicates the length of the threaded fastener or bolt which should be selected.

The invention is useful where a nut-plate is already present on an existing installation the rear side of which is inaccessible, for example where an original bolt has been withdrawn and is to be replaced by a new bolt. It is also useful in the installation of a blind fastener where the rear side is inaccessible. In such a case the equivalent of a nut-plate is formed by expanding a threaded collar at the rear side in a well-known manner and then threading a core bolt into the collar.

The foregoing and other features of the invention will be better understood from the following detailed description and the accompanying drawings of which:

FIG. 1 is a side view of a grip gage according to this invention;

FIG. 2 is an enlarged view of part of the gage of FIG. 1, showing indicia on the gage;

FIG. 3 is a cross-section view of a slidable sleeve included in FIG. 1;

FIG. 4 is a view looking from line 4—4 of FIG. 3;

FIG. 5 is a view looking from line 5—5 of FIG. 1;

FIG. 6 is a view, partially in cross-section, showing part of the grip gage of FIG. 1 engaged through a hole of a workpiece and into a nut-plate with the sliding sleeve positioned to measure the depth of the hole.

FIG. 7 is a side view of a form of sleeve which may be used instead of that shown in FIGS. 3 and 4;

FIG. 8 is an end view of the sleeve of FIG. 7; and

FIG. 9 shows the front portion of a gage which may be used alternatively to that of FIG. 1.

Referring to the drawing, FIG. 1 shows a cylindrical rod 10 extending along a straight linear axis 11 and provided near its rearward end with a cylindrical section 12 (herein referred to as an abutting section) coaxial with axis 11, the cylinder 12 being of somewhat larger diameter than that of the rod 10. Rearward of cylindrical section 12 there is a cylindrical section 13 of somewhat smaller diameter than that of cylindrical section 12, so that there is an annular abutment shoulder 16 in a plane perpendicular to axis 11 at the junction of sections 12 and 13. Preferably the section 14 at the rearward end of the rod is provided with a conical taper tapering rearwardly toward the axis 11. The front end of the rod is flattened at area 15 to provide an easy hang-grip.

The section of rod 10 between shoulder 16 and the flattened area 15 is provided with circumferential markings 17 equally spaced from each other. These graduated markings may conveniently be spaced, for example, at ⅛ inch intervals, although some other spacing may be selected if desired. One of the markings may conveniently be constituted by the plane of the front annular shoulder 18 formed at the junction of section 12 and the circumference of the rod in front of the section 12, this last mentioned plane being perpendicular to the axis 11. Thus, where the graduations 17 are to be at ⅛ inch spacings from each other, the axial length of the section 12 may conveniently also be ⅛ inch or a multiple thereof such as ¼ inch, and the first graduation 17 in front of section 12 will be spaced ⅛ inch from the shoulder 18. There may also be provided intermediate graduated markings 19 midway between successive ones of the graduations 17, so that the spacings between adjacent graduations 17 and 19 will be 1/16 inch when the markings between adjacent graduations 17 are spaced ⅛ inch apart. The graduations 17 may be formed by circumferential grooves around the circumference of the rod. The graduations 19 may be made to distinguish from the marks 17 in any suitable manner, such as for example, by causing them to extend only partway around the circumference, or on the other hand, by applying suitable indicia such as numerals to the graduations 17, as indicated in FIG. 2, or by any other suitable means. A suitable material for the rod is teflon, although some other material may be used.

A sleeve 20, shown in detail in FIGS. 3 and 4, placed over the rod in front of section 12, is dimensioned to make a slip fit over the rod so that it can be made to slide forward and rearward by application of manual force. A suitable material for the sleeve is nylon although some other material may be used. Its outer circumference 21 is cylindrical and the central cylindrical hole 22 through it is co-axial with its outer circumference and of the proper diameter to provide the slip fit over the rod 10. The slip fit is preferably tight enough so that it will not slide on the rod unless it is pushed as by the hand of the operator. The rearward end face 23 lies in a plane transverse to the axis 11 and the front face 24 is likewise transverse to the axis. A counter bore 25 co-axial with the cylinders 21 and 22 is provided in the front face to form a shoulder 26 which is transverse to the axis. The axial depth of the counter bore is just sufficient to accommodate the thickness in the axial direction of a true-arc ring 27, seen in FIG. 5, but for simplicity of illustration is not seen in FIG. 1.

The true-arc ring 27 comprises an annular portion 28 and a protruding portion 29 which extends outward from the annular portion in the radial direction. The annular portion 28 is an incomplete annulus in that it has a discontinuity providing juxtaposed ends of the annulus with a small space 30 between these ends. The protruding portion is formed in two parts 29a and 29b one of which protrudes from the annulus 28 at one side of the discontinuity spacing 30 and the other of which protrudes from the annulus at the opposite side of the discontinuity spacing. The protruding portion also is formed with a second discontinuity which leaves a small space 31 between the juxtaposed ends of portions 29a and 29b. The discontinuity spacings 30 and 31 lie on a radius from the axis 11 and there is a space 32 between these two discontinuities.

The rod 10 is provided with a circumferential groove 33 close to the front end of the rod at the region where the flat portion 15 is located. This groove lies within the cylindrical portion of the rod, but does not extend into the flat region 15. The dimension of the internal surface of the annular portion 28 of the true-arc ring is somewhat smaller than the diameter of the exterior cylindrical surface of rod 10, but is not smaller than the diameter at the base of groove 33 formed in the rod.

After placing the sleeve 20 on the rod at a position rearward of the groove 32 the true-arc ring is set into this groove 33 by springing the ring to a somewhat larger internal diameter than its normal diameter and large enough to slide rearwardly over the rod until it reaches the groove whereupon its elasticity returns it to its normal smaller diameter in the groove. This can be done by grasping the portions 29a and 29b of the protrusion 29 to enlarge the spacings 30 and 31 sufficient to accomplish this. When the true-arc ring is thus set in the groove, all parts of it, including the protrusion 29, lie on the plane shoulder 26 of the sleeve since the internal diameter of the counter-bore 25 is large enough to accommodate the entire true-arc ring when the sleeve is slid forwardly to meet the ring. Thus, the ring serves to block the complete withdrawal of the sleeve from the rod, at least until the ring is removed from the rod.

FIG. 6 illustrates the manner of using the depth gage as an aid in selecting the length of threaded fastener bolt needed for a member or workpiece 35 having a hole 36 through it by which it is to be attached to a typical nut-plate 37. The terms member or workpiece as used herein covers any number of pieces which are to be fastened together, and may include one piece as well as a plurality of pieces. The front flat face 38 of the nut-plate will be placed against the rearward flat surface 39 of the workpiece as seen in FIG. 6. The depth gage of the proper dimensions in relation to the diameter of hole 36 and the threads 40 of the nut-plate, will then be selected and the rearward end of the rod 10 will then be inserted through the hole of the workpiece from its front side until the rearward shoulder 16 of section 12 abuts the surface 38 of the nut-plate while allowing the rearward section 13 to pass within the threads 40 of the nut-plate. The conical taper on rearward section 14 facilitates the entry of this section within the threads of the nut-plate. The proper selection of the depth gage involves selecting one whose section 12 will readily pass through hole 36 while being stopped by surface 38 of the nut-plate, and will also allow section 13 to pass within the threads. In this position the sleeve 20 will be pushed rearward until its rearward surface 23 lies flush with the front surface 41 of the workpiece. The depth gage can then be withdrawn from the hole while allowing the sleeve to remain in this last mentioned position, and the position of the rearward surface 23 relative to the rod 10 will indicate the depth of hole 36, which may be visually seen by reading the graduated marking at this particular position.

FIGS. 7, 8 and 9 illustrate a modification of the grip gage. FIGS. 7 and 8 illustrate a slidable sleeve 50 which is like the sleeve 20 of FIGS. 3 and 4 except that a longitudinally extending slot 51 is formed through a side of the sleeve from the outer circumference into the inner cylindrical surface 52. Although the width of the slot 51 is less than the diameter of rod 10, the resilience of the material of the sleeve is sufficient to allow the slot to be expanded sufficiently to enable the sleeve to be placed on the rod by expanding the slot around the circumferential wall of the rod. When the rod is within the cylinder 52 the slot will return to its normal smaller dimension so that the sleeve will not come off the side of the rod. In this case it will be unnecessary to form a groove 33 as shown in FIG. 1 or to provide a ring 27. Likewise it is unnecessary to provide a counter-bore 25 at an end of the sleeve as shown in FIG. 3. The sleeve may be retained on the rod by forming an enlarged collar 53 at the front end of the rod as shown in FIG. 9.

It is seen that by the present invention there is provided a simple grip gage which will readily indicate the depth of a hole through a workpiece so that there may be selected a bolt of the proper length to fit a nut-plate at the blind side of a workpiece. The gage is useful regardless of whether the nut-plate is attached to an existing installation or whether the nut-plate is formed as part of a blind fastener. As is well-known, an ordinary blind fastener usually comprises a hollow sleeve which protrudes through the hole of the workpiece. A mandrel having a deformable collar threaded to it extends through the sleeve so that when the mandrel is pulled, the collar deforms over the blind end of the sleeve and abuts against the blind surface of the workpiece. Upon removal of the mandrel a core-bolt is commonly inserted through the sleeve and threaded into the threaded collar. The proper size core-bolt is readily selected by use of the gage, which will be inserted through the sleeve of the blind fastener until it abuts the threaded part of the nut-plate created from the deformed collar. It will be understood that the term nut-plate as used herein covers either a permanently installed nut-plate or a form of nut-plate formed by the deformation of the collar of a blind fastener.

This invention is not to be limited by the embodiments shown in the drawings and described in the description which are given by way of example and not of limitation, but only in accordance with the scope of the appended claims.

I claim:

1. A grip gage for measuring the depth of a hole through a member which is to be held by a threaded fastener to a threaded nut-plate having an internal thread with an inside and a base thread diameter, said hole having a hole diameter at least as large as said base thread diameter, comprising:

(a) a rod having a linear axis, adapted to be passed through the hole; said rod having
  (i) a first cylindrical section of a diameter no larger than the diameter of the hole and larger than said inside thread diameter;
  (ii) a second cylindrical section rearward of the first cylindrical section, of lesser diameter than that of the first cylindrical section and adapted to make an axially sliding fit within the threads of the nut-plate;
  (iii) a flat annular shoulder on the first cylindrical section at the junction of the first and second cylindrical sections, in a plane normal to said axis, said shoulder being adapted to abut the annular region of the face of the nut-plate which is to abut the rear face of the member; and
  (iv) graduated markings on the exterior surface of the rod, forward of said shoulder, to indicate distance from the shoulder, said rod at said first and second sections being solid and unslotted, whereby their diameters are invariable; and (b) a sleeve slidable axially on said rod forward of the shoulder, and having a flat face adapted to abut the front face of said member;

whereby when the rod is inserted into the hole until the shoulder abuts the nut while said nut-plate abuts the rear face of the member, and the sleeve is slid to abut the front face of the member, the marking on the stem corresponding to the position of sleeve indicates the depth of the hole.

2. A grip gage according to claim 1 including a tapered region rearward of said second cylindrical section.

3. A grip gage according to claim 1 in which the sleeve is provided with an axially extending slot through the wall of the sleeve, the width of the slot being less than the diameter of the rod, and the material of the sleeve being resilient enough to permit expanding the width of the slot sufficient to allow the side of the rod to be pushed through the slot.

4. A grip gage according to claim 1 in which the rod contains a circumferential groove at a position forward of the sleeve, and a ring is located within the groove, said ring having a portion protruding radially outward from the groove sufficient to prevent the sleeve from separating from the rod.

* * * * *